US006542660B1

(12) United States Patent
Medin et al.

(10) Patent No.: US 6,542,660 B1
(45) Date of Patent: Apr. 1, 2003

(54) METHOD AND SYSTEM FOR INCREASING A NUMBER OF INFORMATION CHANNELS CARRIED BY OPTICAL WAVEGUIDES

(75) Inventors: Michael W. Medin, Roswell, GA (US); Michael L. Wach, Atlanta, GA (US)

(73) Assignee: Cirrex Corp., Alpharetta, GA (US)

( * ) Notice: Subject to any disclaimer, the term of this patent is extended or adjusted under 35 U.S.C. 154(b) by 0 days.

(21) Appl. No.: 09/578,777

(22) Filed: May 25, 2000

Related U.S. Application Data

(60) Provisional application No. 60/135,909, filed on May 25, 1999.

(51) Int. Cl.[7] .................................................. G02B 6/28
(52) U.S. Cl. .......................... 385/24; 385/37; 359/124; 359/130
(58) Field of Search ..................... 385/24, 37; 359/115, 359/124, 130, 341

(56) References Cited

U.S. PATENT DOCUMENTS

| | | | |
|---|---|---|---|
| 4,693,544 A | | 9/1987 | Yamasaki et al. |
| 5,521,733 A | | 5/1996 | Akiyama et al. |
| 5,917,623 A | | 6/1999 | Yoshida |
| 5,974,207 A | | 10/1999 | Askuk et al. .................. 385/24 |
| 6,038,061 A | * | 3/2000 | Sugaya ......................... 359/160 |
| 6,111,688 A | * | 8/2000 | Kobayashi et al. .... 359/337.13 |
| 6,219,474 B1 | | 4/2001 | Cai et al. ........................ 385/24 |
| 6,249,365 B1 | * | 6/2001 | Mizrahi et al. .............. 359/130 |
| 6,282,340 B1 | * | 8/2001 | Nasu et al. ................... 359/124 |

FOREIGN PATENT DOCUMENTS

| | | |
|---|---|---|
| EP | 0 611 097 A1 | 8/1994 |
| JP | 60217315 | 10/1985 |
| JP | 61282803 | 12/1986 |
| JP | 63060410 | 3/1988 |
| JP | 02034806 | 2/1990 |
| JP | 10327128 | 8/1998 |
| JP | 10-327128 | 12/1998 |
| WO | WO 97/06616 | 2/1997 |
| WO | WO 99/21316 | 4/1999 |
| WO | WO 00/72416 A1 | 11/2000 |
| WO | WO 00/72491 A2 | 11/2000 |

OTHER PUBLICATIONS

Bernacki B. E. et al., "Alignment–Insensitive Technique for Wideband Tuning of an Unmodified Semiconductor Laser" Optics Letters, US, Optical Society of America, Washington, vol. 13, No. 9, (Sep. 1, 1988), pp. 725–727 XP000710590 ISSN: 0146–9592 figure 1.

(List continued on next page.)

*Primary Examiner*—Cassandra Spyrou
*Assistant Examiner*—Fayez Assaf
(74) *Attorney, Agent, or Firm*—King & Spalding LLP (57) ABSTRACT

An optical add/drop multiplexing (OADM) device can increase the number of information channels carried by an optical waveguide by utilizing different wavelength regions of light. In other words, each information channel can be assigned a specific wavelength region of light The OADM device can add additional virtual optical waveguides equal to the number of wavelength regions of light that can be efficiently propagated along a single optical waveguide. The OADM device can utilize conventional diode laser technology for adding information channels at predefined wavelength regions into an optical network. The OADM device can stabilize the output wavelength region of a conventional laser diode to any specific wavelength region with minimal hardware or structural modifications. By utilizing off the shelf hardware, the OADM device can lower manufacturing costs while providing an ample supply of spare parts. Further, the OADM device can be used to amplify optical signals that propagate along the improved optical networks of the present invention. The OADM device can be easily interfaced with terminals designed for Synchronous Optical NETworks (SONETs). Also, the OADM device permits functionality of a conventional optical network to remain the same or constant. The OADM device employs cascading and planar light guide circuits to minimize hardware and to reduce signal losses.

20 Claims, 8 Drawing Sheets

OTHER PUBLICATIONS

Clarke R. H., "Fields in Extended Cavity Lasers", IEEE Journal of Quantum Electronics, US, IEEE Inc., New York vol. 24, No. 5, May 1, 1988, pp. 833–842, XP000706012 ISSN: 0018–9197 figure 1.

Corzine S. W. et al., "Actively Mode–Locked Gain As P Laser With Subpicosecond Output" Appliced Physics Letters, American Institute of Physics. New Your, US, vol. 52 No. 5, Feb. 1, 1988, pp. 348–350, XP000706598, ISSN: 0003–6951, p. 348, paragraph 3; figure 1.

Heismann et al., "Electrooptically Tunable Narrow–Linewidth INGAASP–TI:LINB03 Extended Cavity Laser," Optical Fiber Communication Conference., (OFC), US, New York, IEEE, vol. Conf. 10, Jan. 19, 1987, p. 149, XP000713166, ISBN: 0–936659–41–6, The whole Document.

International Search Report dated Oct. 16, 1000 for International Application No. PCT/US 00/14571, for application entitled "Optical Feedback Assembly," filed on May 25, 2000.

International Search Report dated Jul. 28, 2000 for International Application No. PCT/US 00/06868, for application entitled "Optical Network Assembly," filed on Mar. 15, 2000.

Kahn J.M. et al., "High–Stability 1.5M External–Cavity Semiconductor Lasers for Phase–Lock Application "IEEE hotonic Technology Letters, US, IEEE Inc. New York, vol. 1, No. 7, Jul. 1, 1989, pp. 159–161, XP000053582 ISSN: 1041–1135 the whole document.

Partial International Search dated Oct. 19, 2000 for International Application No. PCT/US 00/14567, for application entitled "Method and System for Increasing the Number of Information Channels Carried by Optical Waveguides," filed on May 25, 2000.

Tachikawa Y., et al., "Arrayed–Waveguide Grating Multiplexer with Loop–Back Optical Paths and its Applications," *Journal of Lightwave Technology, IEEE, New York, US*, vol. 14, No. 6, (Jun. 1, 1996), pp. 977–984, XP000598501, ISSN: 0733–8724, abstract, parts II, III, IV and V. A.

Kahn J. M. et al., "High–Stability 1.5M External–Cavity Semiconductor Lasers for Phase–Lock Application" IEEE Photonic Technology Letters, US, IEEE Inc. New York, vol. 1, No. 7, July 1, 1989, pp. 159–161, XP000053582 ISSN: 1041–1135 the whole document.

Patent abstracts of Japan vol. 010, No. 080 (P–441), Mar. 29, 1986 & JP 60 217315, Oct. 30, 1985.

Patent abstracts of Japan vol. 012, No. 280, Aug. 2, 1988 & JP 63 060410 Mar. 1988.

Patent abstracts of Japan vol. 011, No. 144 (P–574), May 12, 1987 & JP 61 282803, Dec. 13, 1986.

Patent abstracts of Japan vol. 014, No. 189 (P–1037), Apr. 17, 1990 & JP 02 034806 Feb. 5, 1990.

* cited by examiner

METHOD AND SYSTEM FOR INCREASING A NUMBER OF INFORMATION CHANNELS CARRIED BY OPTICAL WAVEGUIDES

STATEMENT REGARDING RELATED APPLICATIONS

This application is related to U.S. application Ser. No. 09/579,297, entitled, "Optical Feedback Assembly," filed May 25, 2000, and claims benefit of priority to U.S. Provisional Application No. 60/135,909, entitled, "System For Wavelength Division Multiplexing In Fiber Optic Access Networks," filed May 25, 1999.

TECHNICAL FIELD

This invention relates generally to optical networks. More particularly, the present invention relates to increasing a number of information channels carried by optical waveguides within an optical network.

BACKGROUND OF THE INVENTION

In recent years, the use of optical fibers has become increasingly widespread in a variety of applications. Optical fibers have been found to be especially useful for many industries such as telecommunications, computer-based communications, and other like applications.

Figure 1:
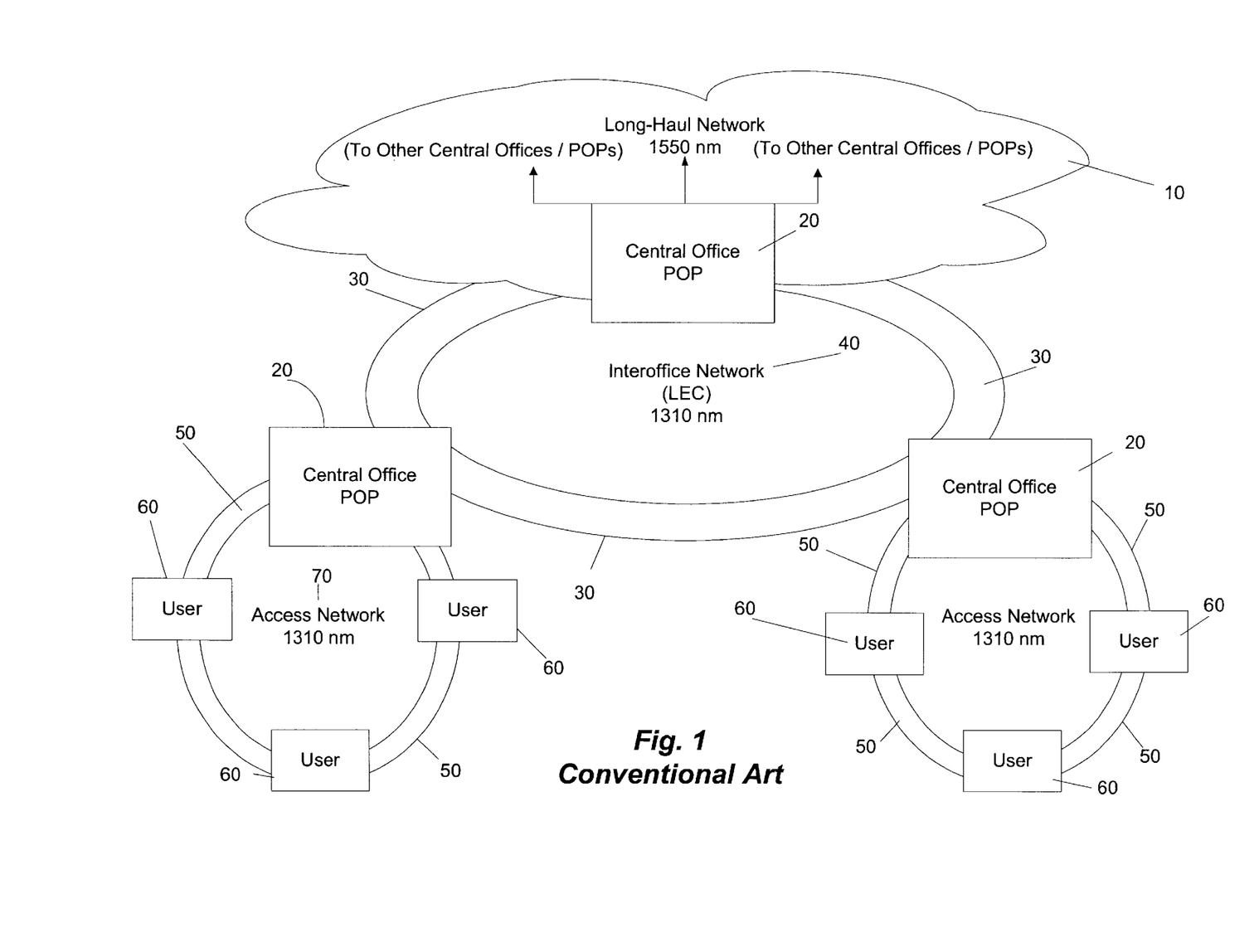
FIG. 1 is a diagram illustrating a conventional long-haul network that connects conventional central offices or points of presence of one city to another.

For example, in the conventional art as illustrated in FIG. 1, a long-haul network 10 connects central offices or points of presence (PoPs) 20 of one city to another. The long-haul network 10 typically utilizes optical waveguides, such as fiber optic cables, that carry information propagating in the 1550 nanometer wavelength region. The long-haul network 10 can interconnect major population areas together. For example, if the central office 20 that connects to the long-haul network 10 was part of a regional hub such as Atlanta, then the central office 20 would have long-haul fiber optic cable routes to Dallas, Chicago, New York, and other major population areas. The long-haul network 10 can be maintained by interexchange carriers (IXCs), such as AT&T, MCI, Sprint, and other like new companies that handle long distance communications.

Each central office or point of presence (PoP) 20 is interconnected to an adjacent central office 20 by optical waveguides 30 that form an interoffice network 40. An interoffice network 40 can be maintained by a local exchange carrier (LEC) such as Bell South, Bell Atlantic, and other companies that handle local communications. Each central office 20 of the interoffice network 40 can also be connected to optical waveguides 50 that form an access network or ring 70. Within an access network or ring 70, each central office 20 can be connected to one or more users 60. A user 60 can comprise local area networks (LANs) that provide services to individual personal computers or voice communications. Each access network 70 may extend across a geographic region on the order of 10 miles (more or less) in circumference, while the interoffice networks 40 may span a geographic region that is in the order of 50 to 100 miles (more or less) in circumference.

Because of the relative size of the access networks 70, communication providers typically employ synchronous optical network (SONET) standards for multiplexing and transporting data streams through the optical waveguides 50. The SONET standard is based upon a time division multiplexing (TDM) technique. However, despite the use of the time division multiplexing technique, conventional access networks 70 are approaching bandwidth exhaustion due to the demand created by the public Internet and/or virtual private intranets. Conventional access networks 70 are typically designed as optical carrier 3 (OC3) SONET rings meaning that the maximum capacity at any point in the optical waveguides 50 that form the access networks 70 have a capacity of 155 megabits per second. OC3 SONET rings can carry only three DS3 signals or eighty four DS1 signals on a entire ring. DS stands for a classification of transmitting one or more communications in a digital data stream. A DS1 level means that data is transmitted at 1.544 megabits per second while DS3 signals transmit data at 45 megabits per second. Users 60 are pressuring access network providers to support data transmitted at DS3 or higher rates as opposed to DS1 rates because current LANs operate much faster than DS1 streams.

To increase capacity of conventional optical networks, such as to accommodate eighty five DS1 signals or a fourth DS3 service, an entire OC3 SONET ring or access network 70 would require an upgrade to the optical carrier 12 (OC12) level that permits a maximum transmission capacity of 622 megabits per second at any point in an optical fiber. Such an upgrade would require complete replacement of add/drop multiplexers (ADMs) 220 (See FIG. 2) in the ring with larger capacity units.

Figure 2:
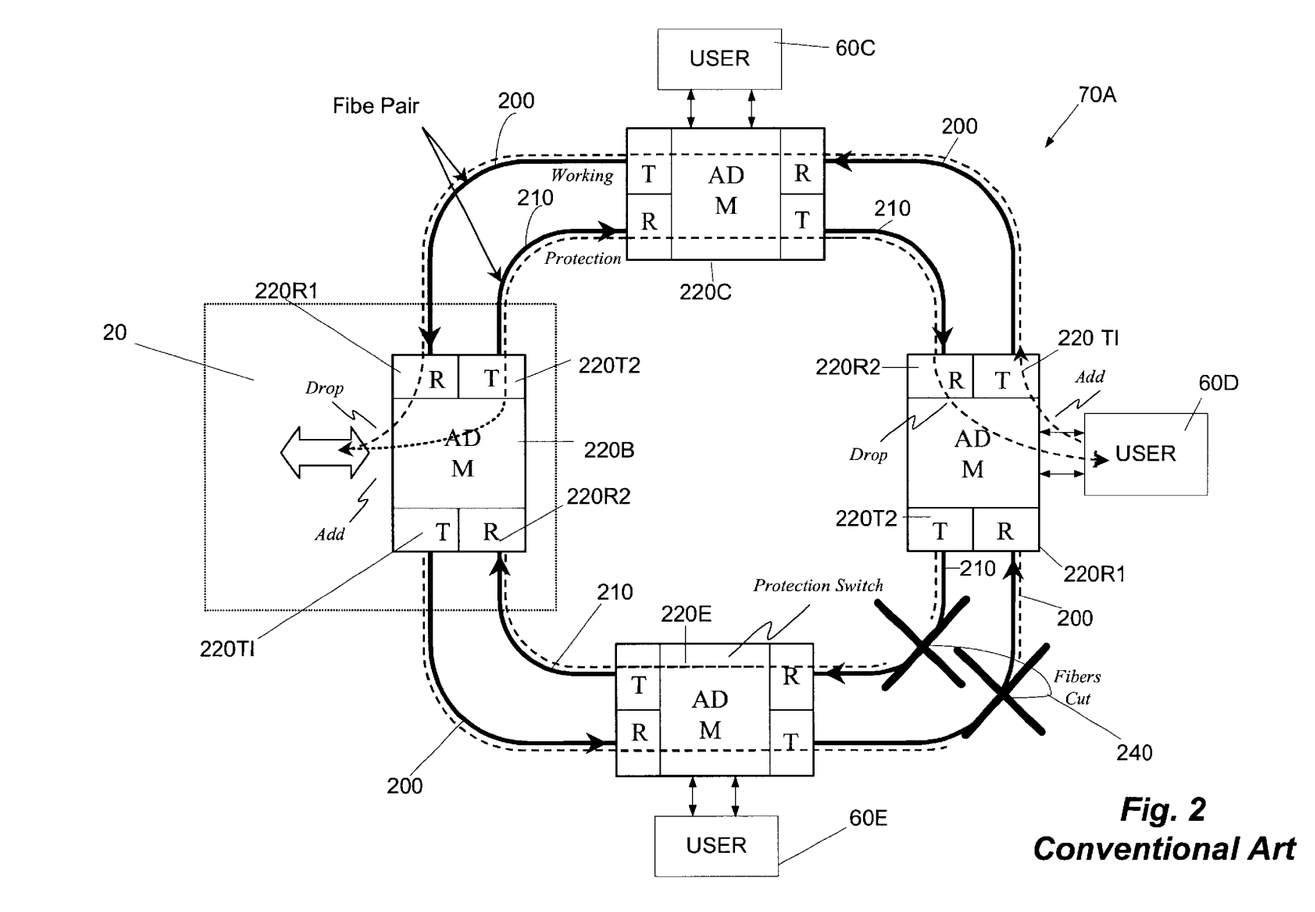
FIG. 2 is a diagram illustrating a conventional SONET access network.

Adding to the complexity of an upgrade to the SONET ring 70A is the current reliance by the industry on the unidirectional path switched ring (UPSR), as illustrated in FIG. 2. The UPSR 70A is a SONET architecture that is particularly well-suited for access networks 70 in which traffic from multiple users 60 is hubbed into a network provider's central office or a point of presence (PoP) 20. The UPSR 70A includes fiber pairs 200, 210 that link multiple SONET add/drop multiplexers (ADMs) 220B–220E located at central offices/PoPs 20 and at remote locations accessible to users 60. Traffic, in the form of DS1 or DS3 serial data bit streams originating from each user 60, is multiplexed into the UPSR aggregate bit stream along optical waveguides 200, 210 at OC-3 or OC-12 data rates for transport to the central office or point of presence (PoP) 20. For example, a user 60D typically "adds" an information signal to the aggregate data bit stream propagating along the outside optical waveguide 200 via the transmitter 220T1. Similarly, the user 60D "drops" an information signal from the aggregate data bit stream propagating along the outside optical waveguides 200 via the receiver 220R1.

Information traffic normally flows in one direction around the SONET ring 70A, using the working fiber 200 as indicated by the arrows denoting counter-clockwise flow. In the event of a single fiber or ADM transceiver failure, the information traffic is automatically redirected around the SONET ring 70A, using a protection fiber 210 in accordance with the UPSR automatic protection switching (APS) feature. For example, if two optical waveguides between two ADMs 220 simultaneously fail at points 240, such as optical waveguides 200 and 210 between user 60D and user 60E, then the UPSR APS feature will cross-connect the remaining working and protection fibers 200, 210 to bypass the failed sections in order to maintain continuity of information flow at each user's connection. Therefore, instead of user 60D "adding" and "dropping" information signals from the working optical waveguide 200, the user 60D would "add" signals to the working optical waveguide 200 via transmitter 220T1 and "drop" information signals from the protection optical waveguide 210 via the backup receiver 220R2 as illustrated in FIG. 2.

The robust protection switching capabilities of the UPSR make this SONET architecture preferable to other conventional topologies, such as star and tree-branch topologies for high availability fiberoptic access networks. With this protection scheme, a central office or point of presence (PoP) 20 would "receive" or "drop" information signals with the primary receiver 220R1 and transmit or "add" information signals to the SONET network 70A via the backup or secondary transmitter 220T2. It is noted that the "working" fiber 200 and "protection" fiber 210 may not be dedicated lines. In other words, the APS feature of an USPR may comprise complex switching techniques where a "working" or "protection" fiber is merely an optical path within an optical fiber that is a result of the complex switching techniques. The working fibers 200 and protection fibers 210 have been denoted as such in FIG. 2 for illustrative purposes only. That is, protection fibers 210 of FIG. 2 may carry information continuously while only an optical path generated by a switching technique is dedicated within the protection fiber 210 for the APS feature.

While the automatic protection switching feature of a unidirectional path switched ring makes a SONET architecture very desirable and dependable, such an optical architecture still suffers from signal losses that are present in any optical architecture. In order to compensate for such signal losses, amplifiers may be needed within each respective optical network 70A. However, conventional optical amplifiers, such as Erbium Doped Fiber Amplifiers (EDFAs), only operate in the 1530–1560 nanometer wavelength range. That is, conventional optical amplifiers are not designed to function within the 1310 nanometer wavelength range of interoffice networks 40 and access networks 70.

Accordingly, a need in the art exists for a method and system that can amplify optical signals propagating at various wavelength regions. More specifically, there is a need in the art for an optical amplifier that can be utilized in interoffice networks, access networks, and well as long haul networks. An additional need in the art exists for a method and system for increasing a number of information channels that can be carried by an optical waveguide. There is a further need in the art for a method and system for increasing a number of information channels carried by an optical waveguide that can be readily adapted or configured to work with existing optical network architectures. That is, there is a need in the art for a method and system that can increase a number of information channels carried by an optical waveguide but where an existing SONET architectures or SONET protocol is not affected by the increase in information channels. Specifically, there is a need in the art for a method and system that can substantially increase information traffic carried by an optical waveguide but can still retain the benefits of an automatic protection switching feature of a unidirectional path switched ring. Another need exists in the art for a method and system that can increase information traffic carried by an optical waveguide at relatively low cost with out replacing existing optical equipment and in a way where spare parts can be easily manufactured.

SUMMARY OF THE INVENTION

The present invention solves the problems of conventional optical networks by providing an optical add/drop multiplexing (OADM) device that can increase the number of information channels carried by an optical waveguide. The OADM device can increase the number of information channels within an optical waveguide by utilizing different wavelength regions of light. In other words, each information channel can be assigned a specific wavelength region of light. It is noted that a "wavelength region" can be defined as a span of wavelengths that is adjacent or approximate to a specific wavelength. In other words, a wavelength region of $\lambda_1$ can include neighboring wavelengths of a desired threshold. For example, if it is desirable to have a threshold of one-fourth, a wavelength region of $\lambda_1$ could encompass wavelengths that are 0.25 below and above the central wavelength of $\lambda_1$. The threshold can be adjusted depending upon the application of the present invention.

By carrying information on multiple wavelength regions of light, the present invention can add virtual optical waveguides to existing physical optical waveguides. Stated differently, the present invention can carry information along information channels equivalent to separate dedicated physical optical waveguides that could be added to existing optical network systems. The OADM device can add additional virtual optical waveguides equal to the number of wavelength regions of light that can be efficiently propagated along a single optical waveguide. This means that if an optical waveguide can propagate twelve different wavelength regions of light, then an optical waveguide propagating light energy in this fashion would be equivalent to twelve separate conventional waveguides that could each carry a single wavelength region.

The present invention has an architecture such that it can be overlayed on conventional optical networks with minimal hardware or retrofitting or both. The invention can create additional optically transparent paths that permit the use of conventional optical network terminals. For example, the present invention can be easily interfaced with terminals designed for Synchronous Optical NETworks (SONETs). Further, the OADM device permits functionality of a conventional optical network to remain the same or constant.

In other words, if a conventional optical network, such as a SONET ring, has a protective switch capability where a protection optical waveguide is used if a working optical waveguide is broken or incapable of handling its information traffic, then such a protective switch capability would operate similarly as if the OADM device was not present. Stated simply, the present invention can be overlayed on conventional optical network systems such that an information channel operating according to a conventional network protocol is unaffected. Meanwhile, the present invention provides additional channels that do not need to be dependent on the conventional optical network protocol.

In addition to providing multiple channels that can be independent of a conventional network protocol, the present invention can utilize conventional protection optical waveguides for regular information traffic to increase the number of optical paths that lead to a central office or optical network service provider. That is, by utilizing conventional protection optical waveguides that exist in conventional optical network structures, such as SONET rings, the number of paths that lead to a central office can be doubled. For example, if a user is assigned an non-SONET information channel of a particular wavelength region and if two conventional optical waveguides of a SONET UPSR are utilized for information traffic, then the assigned non-SONET information channel for the user can have two bidirectional information routes that lead back to a central office.

With the present invention, information channels that propagate at predefined wavelength regions and that are unassigned at a particular terminal can be passed through a terminal with little or no energy loss. That is, the OADM device uses cascading technology that lets unwanted or unassigned information channels to pass through a terminal with minimal hardware. Conversely, conventional multiplexing technology typically requires a plurality of separate optical waveguides that are later recombined into a single optical device. Unlike the conventional multiplexing technology, the present invention has less hardware which, in turn, decreases the potential for any insertion losses.

The OADM device can utilize conventional diode laser technology for adding information channels at predefined wavelength regions into an optical network. In other words, the OADM device can stabilize the output wavelength region of a conventional laser diode to any specific wavelength region with minimal hardware or structural modifications. By utilizing off the shelf hardware, the OADM device can lower manufacturing costs while providing an ample supply of spare parts. Further, the same technology of the OADM device that increases the operating wavelength spectrum of conventional laser diodes can be used to amplify optical signals that propagate along the improved optical networks of the present invention. This dual functionality of the OADM device can further decrease its manufacturing costs.

The structure and functionality of the OADM device contribute to an efficient electronic packaging design. Each OADM device yields to an efficient field configurable unit that can be easily installed or replaced or both at a particular terminal. For example, each OADM device can be designed to add or drop (or add and drop) only one channel of a specific wavelength region. A terminal can include two OADM devices, one for each fiber of a two fiber network ring. Each OADM device may be configured with one or more wavelength adapter modules (discussed below) depending upon the number of information channels that will be handled by a particular terminal. That is, if a terminal is designed to operate on four wavelength regions, then four wavelength adapter modules can be installed within each OADM device for that terminal.

Each OADM device can comprise a wavelength adapter module and a filter module. Each wavelength adapter module can comprise a photodetector, a laser diode, and a Bragg grating. The Bragg grating can be combined with an optical waveguide. That is, the Bragg grating can be disposed within or adjacent to the optical waveguide. Each wavelength adapter module can be connected to a respective filter module that includes a planar light guide circuit and one or more optical waveguides and thin film interference filters. Each wavelength adapter module can be designed to modulate an incoming optical signal at a predefined wavelength region.

In one exemplary embodiment, the OADM device can drop one or more specific information channels operating at predefined wavelength regions at a terminal. In such an embodiment, the output ports of a filter module can be connected to input ports of a telecommunication device or computing device.

In another exemplary embodiment, the OADM device can amplify one or more specific information channels operating at predefined wavelength regions. In this embodiment, the output ports of a filter module can be redirected to the input ports of respective wavelength adapter modules. The wavelength adapter modules can, in turn, amplify the optical energy present at their input ports.

DETAILED DESCRIPTION OF EXEMPLARY EMBODIMENTS

With the present invention, additional virtual optical waveguides equal to the number of wavelength regions of light that can be efficiently propagated along a single waveguide can be added to existing optical network architectures. That is, the OADM device of the present invention can increase the number of information channels carried by an optical waveguide by utilizing different wavelength regions of light to propagate information signals. Each information channel generated by the present invention can be assigned a specific wavelength region of light so that multiple channels can be propagated simultaneously along a single optical waveguide. As noted above, a "wavelength region" can be defined as a span of wavelengths that are adjacent or approximate to a specific wavelength. In other words, a wavelength region of $\lambda_1$ can include neighboring wavelengths of a desired threshold. For example, if it is desirable to have a threshold of one-fourth, a wavelength region of $\lambda_1$ could encompass wavelengths that are 0.25 below and above the central wavelength of $\lambda_1$. The threshold can be adjusted depending upon the application of the present invention.

The present invention can be overlayed on conventional optical networks with minimal hardware or retrofitting. The present invention can be overlayed on conventional optical network systems such that information channels operating according to conventional network protocols are unaffected. Meanwhile, the present invention provides additional channels that do not need to be dependent on the conventional optical network protocols therein.

The present invention can utilize conventional laser diode technology for adding information channels at predefined wavelength regions into an optical network. The present invention can stabilize the output wavelength region of a conventional laser diode to any specific wavelength region with minimal hardware or structural modifications. By utilizing off the shelf hardware, the present invention can lower the manufacturing costs of an optical network while providing an ample supply of spare parts. Further, the present invention can be used to amplify optical signals in addition to increasing the operating wavelength spectrum of a conventional laser diode.

Referring now to the drawings, in which like numerals represent like elements throughout the several figures, aspects of the present invention in the preferred operating environment will be described.

Figure 3:
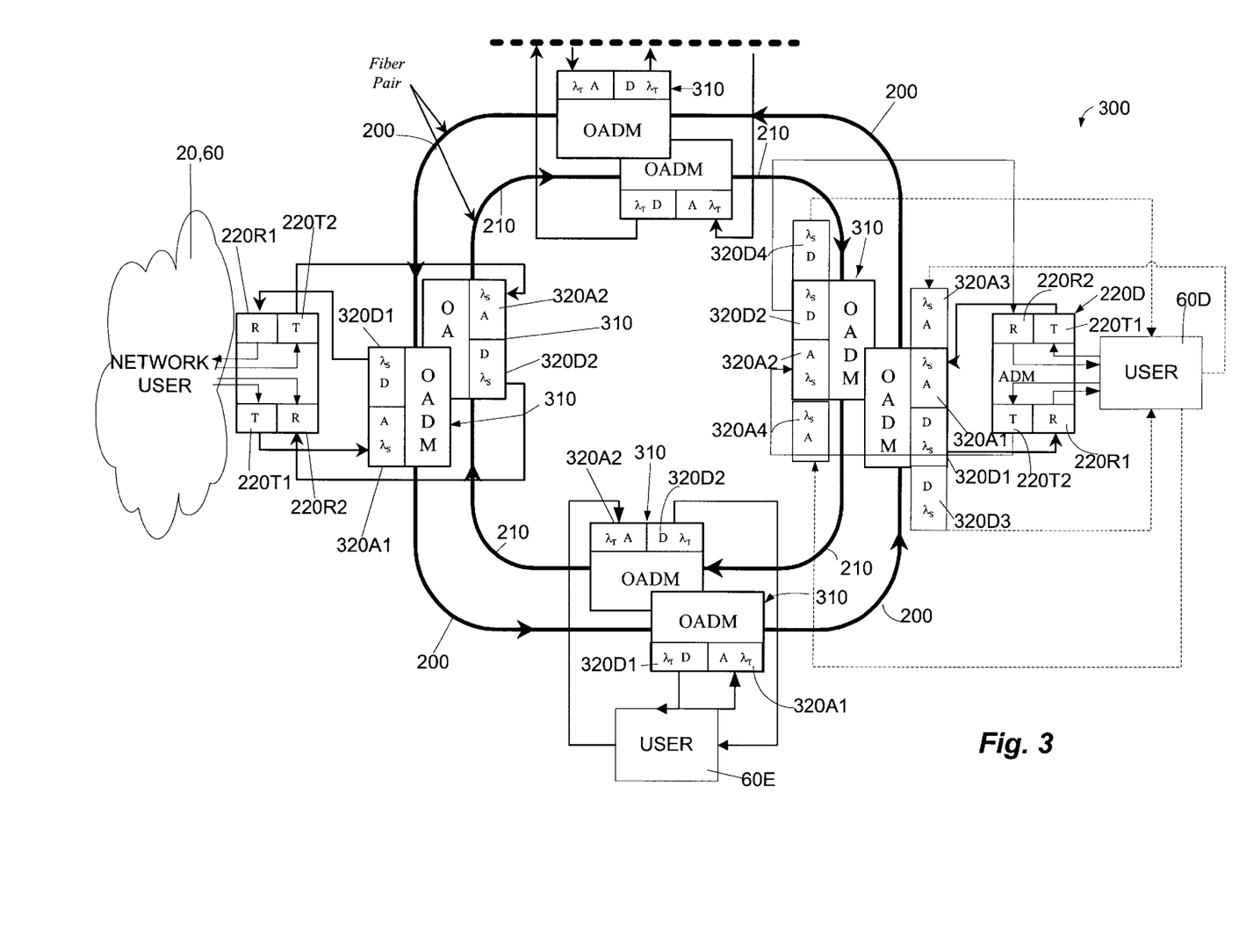
FIG. 3 illustrates an exemplary optical network that includes a SONET network overlayed with optical add/drop multiplexing (OADM) devices of the present invention.

FIG. 3 illustrates an exemplary optical network 300 that includes a SONET network overlayed with optical add/drop multiplexing (OADM) devices 310 of the present invention. Each OADM device 310 of user 60D and network/user 20,60 is connected to a respective transmitter/receiver pair of an ADM terminal 220 in addition to a respective pair of fibers. For example, the add/drop multiplexer 220B connected to the central office or point of presence (PoP) 20 has two sets or pairs of transmitters and receivers 220T1, 220R1, 220T2, and 220R2. A first or primary receiver 220R1 of the ADM 220B is connected to a drop channel 320D1 of an OADM device 310. Similarly, a first or primary transmitter 220T1 of the ADM 220B is connected to an add channel 320A1 of the OADM 310. The second or secondary transmitter 220T2 of ADM 220B is connected to an add channel 320A2 of an OADM device 310 that is also connected to an optical waveguide 210 that forms an inner ring of the optical network 300. The second or secondary receiver 220R2 of the ADM 220B is connected to a drop channel 320D2 of the OADM device 310 that is connected to the optical waveguides 210 that form the inner ring of the network 300. The remaining users, such as user 60C, can have OADM devices 310 according the present invention connected to SONET terminals or the OADM devices 310 directly connected to the respective optical waveguides 200, 210. In another exemplary embodiment, user 60D can also be directly connected to OADM devices 310 via add channels 320A3, 320A4 and drop channels 320D3, 320D4 in addition to the channels connected to the OADM devices 310 via the ADM terminal 220D. The user 60D can send non-SONET information to the network 300 via add channels 320A3, 320A4 and receive non-SONET information via drop channels 320D3, 320D4.

With the optical network 300 illustrated in FIG. 3, ADM terminals 220B and 220D can support conventional network protocols without any interference or interaction from the OADM devices 310 of the present invention. In other words, the present invention can be overlayed on conventional optical network systems such that an information channel operating according to a conventional network protocol is unaffected. This means that the automatic protection switching (APS) feature of unidirectional path switched rings for SONET networks can be utilized with the present invention. Such automatic protecting switching features operate seamlessly as if the OADM devices 310 were not present within the optical network 300.

In addition to permitting conventional network protocols to be propagated therein, the present invention can create additional virtual optical waveguides equal to the number of wavelength regions of light that can be efficiently propagated along a single waveguide. Further, in addition to the extra information channels that are made available for each respective optical waveguide within the network 300, the present invention can increase the number of optical paths that lead to a central office or point of presence (PoP) within an optical network 300. That is, by utilizing all of the optical waveguides available to each OADM device 310 of the present invention, the number of paths that lead to a central office or point of presence (PoP) 20 can be doubled. For example, a user 60E that is connected directly to OADM devices 310, without any interface with a SONET ADM terminal, can utilize both sets of add/drop channels 320A1, 320A2, 320D1, and 320D2 to propagate information to the central office or point of presence (PoP) 20. That is, the user 60E can propagate non-SONET information channels along optical waveguides 200 of the outer ring in counter clockwise direction.

The user 60E can propagate non-SONET information channels along the optical waveguides 210 of the inner ring in a clockwise direction. Similarly, the user 60D, who is also connected directly to the OADM devices 310 via add channels 320A3, 320A4 and drop channels 320D3, 320D4, can propagate non-SONET information channels along optical waveguides 200 and 210. The term, "non-SONET information channel" is defined as an information channel which does not operate according to any SONET protocol. With the present invention, both SONET protocol and non-SONET information channels can be propagated simultaneously on the same access network, thus expanding the network's information carrying capacity. Typically, for propagating non-SONET information channels, a user will be directly connected to a respective set of OADM devices 310.

Further to increasing the number of information routes that lead back to a central office or point of presence (PoP) 20, the present invention permits information channels that propagate at predefined wavelength regions and that are unassigned at a particular terminal to be passed through such a terminal with little or no energy loss. That is, the OADM devices 310 that are disposed between the user 60D and central office or point of presence (PoP) 20 may use cascading technology to let unwanted or unassigned information channels to pass through a respective OADM device 310 with minimal hardware and signal losses. In other words, a single optical channel operating at a predefined wavelength region can be assigned to the user 60 and central office or point of presence (PoP) 20. In this way, the OADM devices 310 between the users 60D and each central office or point of presence (PoP) 20 can permit unwanted or unassigned information channels to pass through a respective terminal 220 with minimal hardware or signal losses or degradation.

For example, optical or light energy operating according to a SONET protocol and at a wavelength region of $\lambda_s$ would be manipulated (dropped or added or both) by a respective OADM devices 310 operating at an assigned wavelength region of $\lambda_s$. Conversely, those OADM devices 310 that are assigned some arbitrary information channel operating according to a non-SONET protocol and at a wavelength $\lambda_T$ would permit information operating according to a SONET protocol and at the wavelength region $\lambda_s$ to pass therethrough without any further signal losses or manipulation of data content.

As noted above, if a user is assigned a non-SONET information channel of a particular wavelength region, such as $\lambda_T$, and if two conventional optical waveguides of the SONET ring 300 are utilized for regular information traffic, then the assigned non-SONET wavelength region $\lambda_T$ of light for a user can have two bidirectional information routes that lead back to the central office or point of presence (PoP) 20. More specifically, a user 60E can transmit non-SONET information with add channel 320A1 of the OADM device 310. The add channel 320A1 feeds optical energy into optical waveguide 200. Similarly, the user 60E can also transmit non-SONET information with add channel 320A2 that is connected to the secondary optical waveguide 210. The user 60E can receive information from drop channel 320D2 which is connected to secondary optical waveguide 210. The user 60E can also receive information via drop channel 320D1 that is connected to the primary optical waveguide 200.

In summary, each adjacent respective pair of add and drop channels, such as add channel combination 320A1 and 320A2, and drop channel combination 320D1 and 320D2 form bidirectional information routes that link a user 60E to a central office or point of presence (PoP) 20. These bidirectional information routes are available for the information channels that propagate at wavelength regions outside of the information channel that propagates according to SONET protocol and the automatic protection switching features. In other words, such bi-directional information routes are usually only available for non-SONET information channels.

Figure 4:
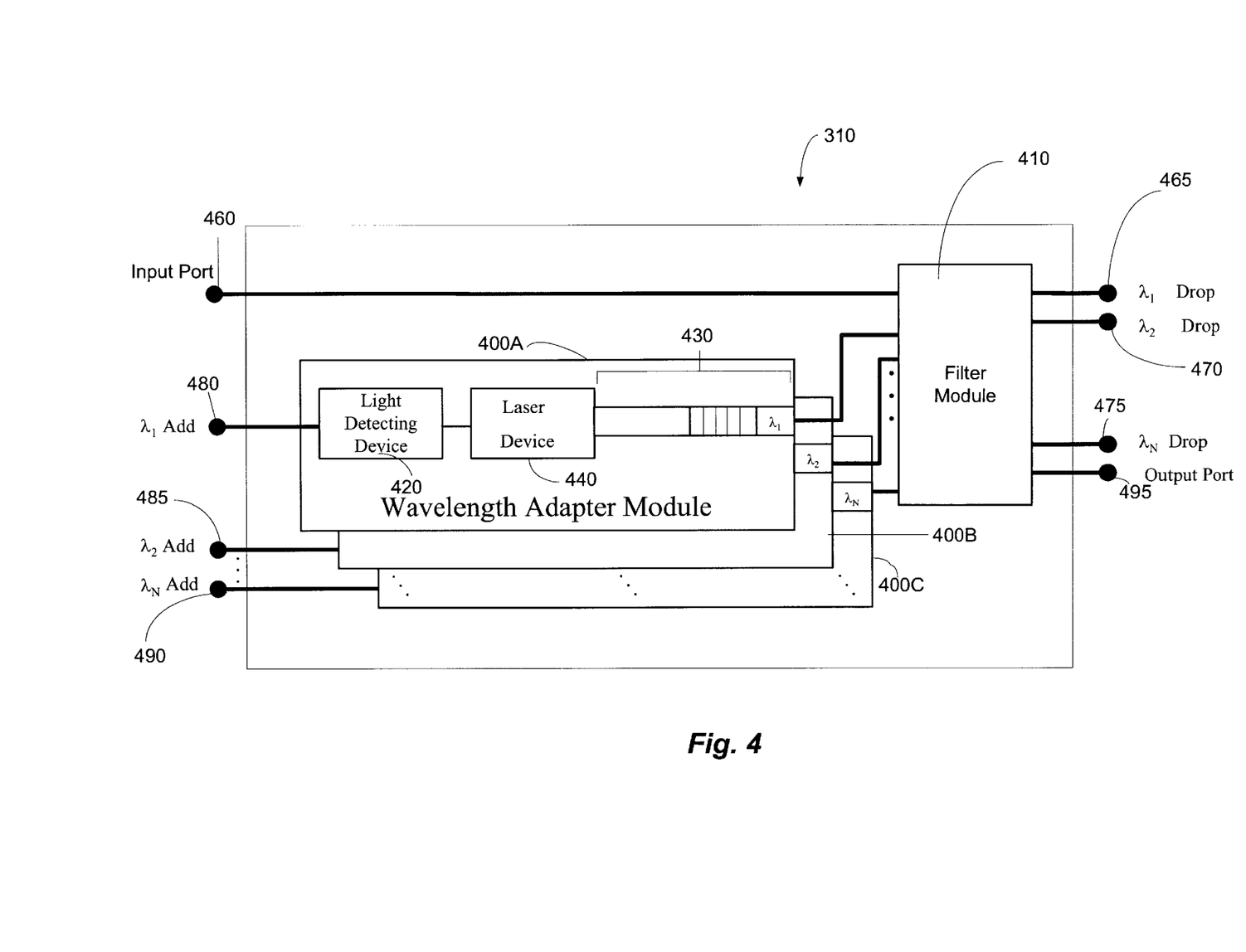
FIG. 4 is a diagram that illustrates an OADM device according to an exemplary embodiment of the present invention.

FIG. 4 is a diagram that illustrates an OADM device 310 according to an exemplary embodiment of the present invention. Each OADM device 310 may include one or more wavelength adapter modules 400 that are connected to a filter module 410. The filter module 410 can incorporate a number of fiber optic light manipulation and management methods that are described in U.S. Pat. No. 5,953,477 issued to Wach et al., and are marketed by the assignee of the present application, Cirrex, Inc. of Atlanta, Ga. The content of U.S. Pat. No. 5,953,477 is hereby incorporated by reference.

Each wavelength adapter module 400 includes a light detecting device 420, an optical feedback assembly 430, and a laser device 440. Each light detecting device 420 can comprise a photo detector. An optical feedback assembly 430 can comprise a filtering device in combination with a partial reflecting device or a wavelength selective reflector positioned proximate to the laser device 440 for propagating a predefined wavelength region back into the laser device 440. The signal of the optical feedback assembly 430 fed back into the laser device 440 causes the laser device to become substantially stabilized within the wavelength region of the reflected optical energy. The laser device 440 can be a Fabry-Perot semiconductor laser. Other types of lasers are not beyond the scope of the present invention.

The laser device 440 may have an output which is modulated so as to produce a dense wavelength division multiplexing (DWDM) channel. It is noted that dense wavelength division multiplexing refers to a process where multiple channels of information are propagated at different wavelength regions that can be spaced spectrally at a set wavelength or frequency distance apart from one another. On the other hand, wavelength division multiplexing (WDM) may refer to a process where information channels are propagated at different wavelength regions that are hundreds of nanometers apart. For example, in WDM, an information channel may propagate at the 1310 wavelength region of the optical spectrum while another information channel may propagate at the 1550 nanometer wavelength region of the optical spectrum. For DWDM, information channels can propagate at industry standard spacings that may be on the order of one or two wavelengths (or a fraction thereof), such as one or two nanometers, apart from one another.

The optical feedback assembly 430 can be a Bragg grating that is a form of external feedback control which can maintain the laser output wavelength region to within one nanometer of the Bragg wavelength. In one exemplary embodiment, the optical waveguide for the Bragg grating supports single mode light propagation. Alternatively, optical feedback assembly 430 can employ thin-film interference filters in combination with a partial reflector or mirror within an optical waveguide stub (not shown) to achieve similar feedback control. Details of the optical feedback assembly have been developed and are marketed by the assignee of the present application, Cirrex, Inc. of Atlanta, Ga. Additional details for the optical feedback assembly 430 are described in commonly assigned, U.S. patent application Ser. No. 09/579,297, filed May 25, 2000, entitled "Optical Feedback Assembly", the content of which is hereby incorporated by reference.

The optical feedback assembly 430 can be designed so that the laser device 440 "locks" on to a the predetermined wavelength region produced by the optical feedback assembly 430. The predetermined wavelength region can support a single information channel. Multiple predetermined wavelength regions can be generated by separate laser devices 440 such that multiple information channels can be generated. The multiple predetermined wavelength regions can form a spectral grid that includes the 1310 nm or 1550 nm wavelength regions. The 1310 nm wavelength region is typically the operating wavelength regions for access networks, while the 1550 nm wavelength region is typically the operating wavelength region for long-haul networks.

Unstabilized non-monochromatic or monochromatic light energy can be received at input port 460 which feeds into the filter module 410. The filter module 410 can drop one or more information channels propagating at predefined wavelength regions via drop ports 465, 470, and 475. The filter module 410 employs cascading technology that can permit unwanted or unassigned information channels to pass through the OADM device 310 with minimal hardware. In other words, unassigned information channels can flow through the filter module 410 of a respective OADM device 410 without significant manipulation. Alternatively, as illustrated in FIG. 4, the filter module 410 can be designed to drop channels propagating at predefined wavelength regions such as $\lambda_{\text{-}1}$, $\lambda_{\text{-}2}$, and $\lambda_{\text{-}N}$. Further details of the filter module will be described with respect to FIG. 5.

In addition to performing a dropping function, the filter module 410 can also add and recombine one or more channels of information via add ports 480, 485, and 490. Each add port 480, 485, and 490 can receive unstabilized non-monochromatic or monochromatic light energy. This light energy is then fed into a respective wavelength adapter module 400 which can transform unstabilized non-monochromatic or monochromatic light energy into one channel of stabilized monochromatic light energy having a predefined wavelength region.

For example, add port 480 could receive conventional unstabilized monochromatic light energy that is being propagated according to a SONET protocol. This light energy is then fed into the photo detector 420 of the wavelength adapter module 400. The photo detector 420 then modulates the output of the laser device 440. The optical feedback assembly 430 can then output stabilized monochromatic light energy having a predefined wavelength region, such as $\lambda_{\text{-}1}$. This stabilized monochromatic light energy having the predefined wavelength region of $\lambda_{\text{-}1}$ can then be fed into the filter module 410 where it is recombined with the light energy propagating through the filter module 410.

After dropping, adding, and recombining one or more channels of stabilized monochromatic light energy, the filter module 410 then can output a wavelength division multiplexed light signal at Output port 495. Since the wavelength adapter modules 400 are required only when a signal from external equipment is to be added to the wavelength-multiplexed optical signal or amplified (as discussed below), the OADM device 310 can be flexibly configured with one or more wavelength adapter modules 400. The wavelength adapter modules 400 can installed in the field when a new information channel is desired or when existing information channels are reallocated or shifted from their existing operating wavelength regions. For each of the information channels in which a wavelength adapter module 400 is not installed, the drop port of the filter module can be looped back (not shown in FIG. 4 but shown in FIG. 5, discussed below) to a corresponding input port so that these information channels are passed through the filter module 410 without any significant signal loss and with minimal hardware.

Figure 5:
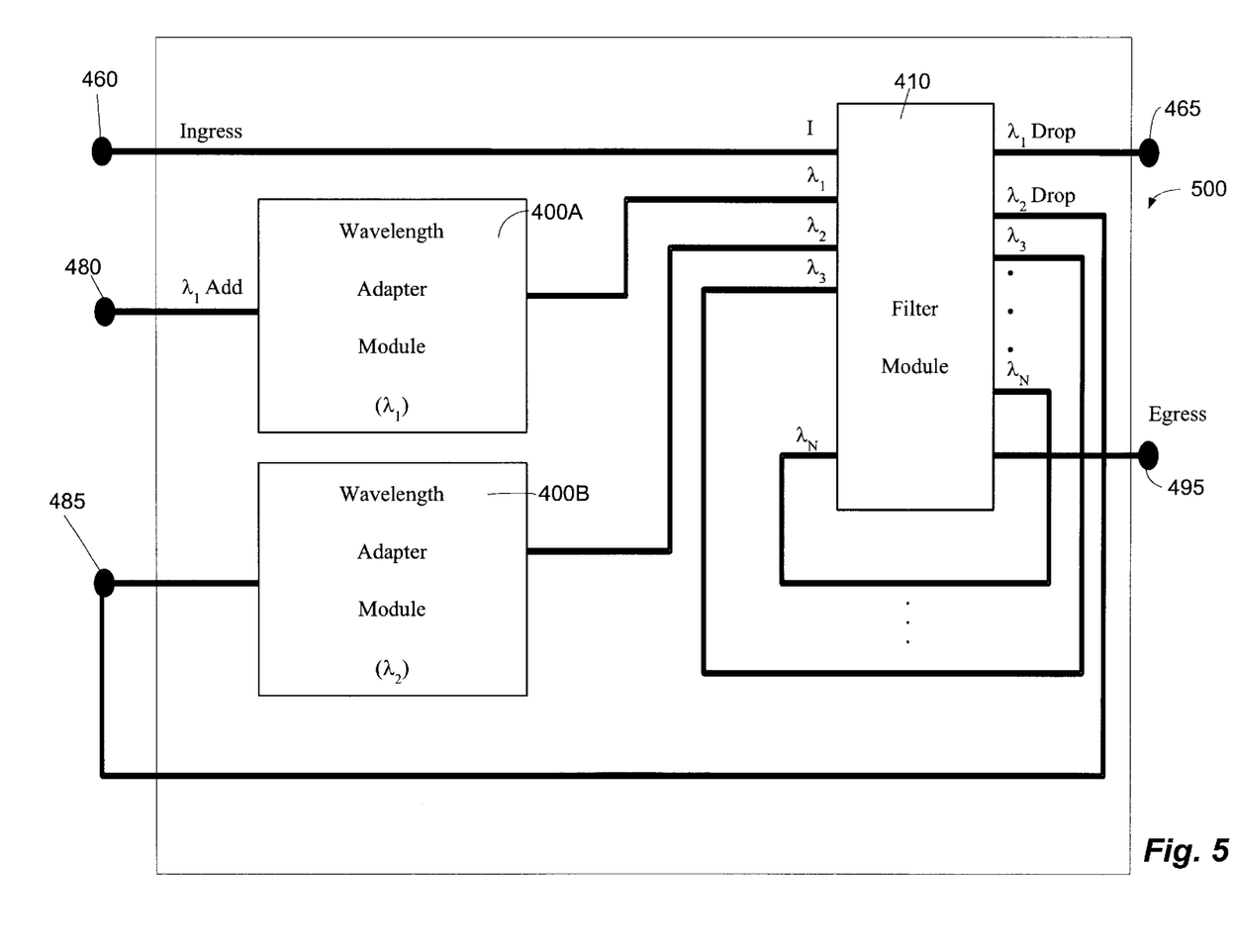
FIG. 5 is a diagram that illustrates an amplifying configuration of the OADM device according to an alternate exemplary embodiment of the present invention.

FIG. 5 is a diagram that illustrates an amplifying configuration according to an alternate exemplary embodiment of the present invention. In FIG. 5, an OADM device 500 is configured to amplify stabilized monochromatic light energy that may have one or more information channels propagating at one or more predefined wavelength regions. In the exemplary embodiment illustrated in FIG. 5, the OADM device 500 is designed to amplify an information channel propagating at a predefined wavelength region of $\lambda_2$. When wavelength division multiplexed light energy enters into the Input port 460, it is then fed into a filter module 410 where multiple information channels can be dropped and passed through the filter module 410.

For the information channel propagating at the predefined wavelength region of $\lambda_2$, this information channel is dropped and then fed into add port 485. The light energy is then manipulated by the wavelength adapter module 400B. Because the light energy fed into the wavelength adapter module 400B is remodulated, the light energy is also amplified. This amplified light energy or information channel propagating at the predefined wavelength region of $\lambda_2$ is then fed back into the filter module 410 where it is recombined with the light energy propagating through the filter module 410. With the embodiment of the OADM device 500 illustrated in FIG. 5, light energy can be amplified so that it can propagate through large-circumference access rings.

Figure 6:
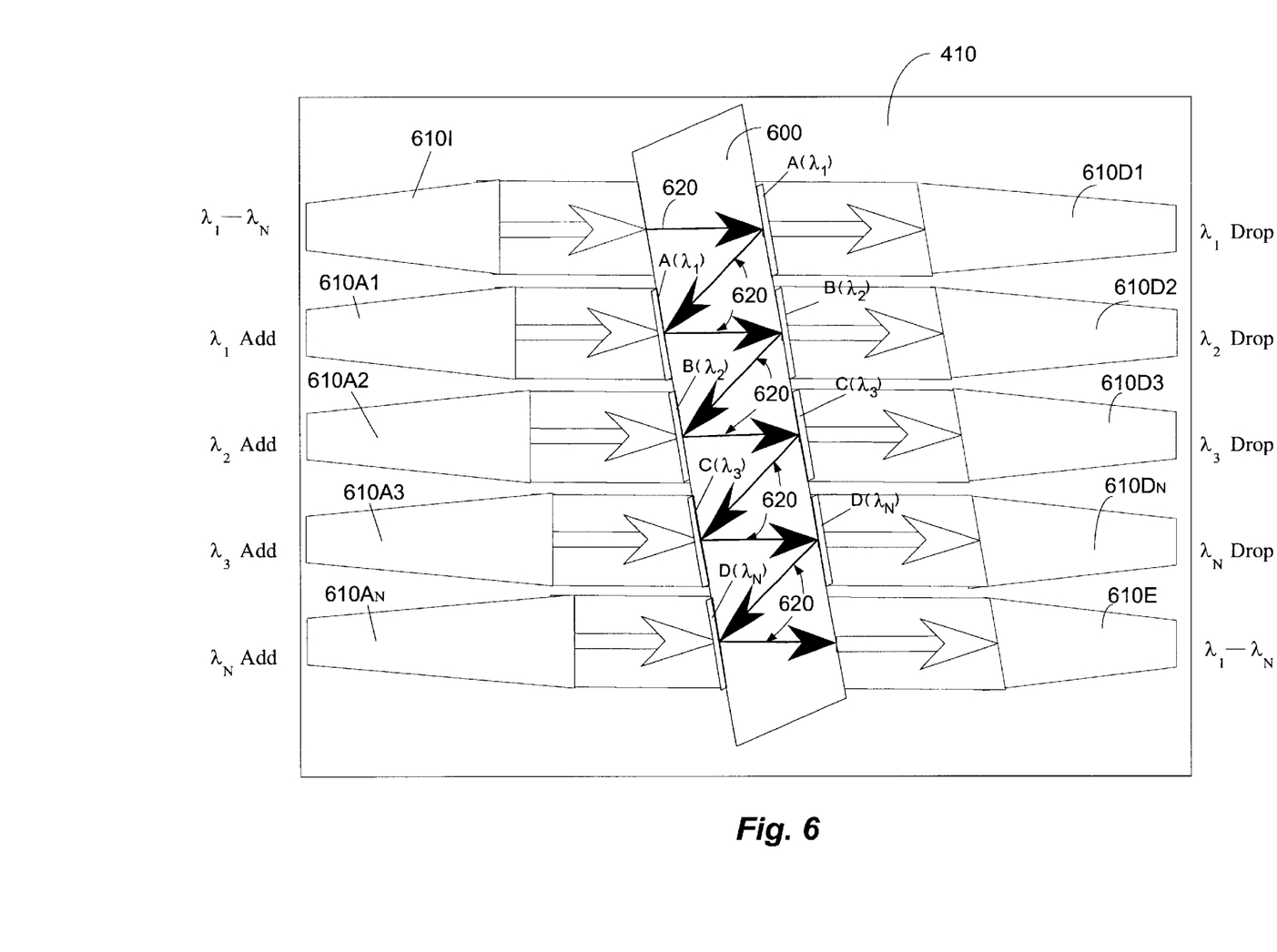
FIG. 6 is a diagram that illustrates a filter module of an OADM device according to an exemplary embodiment of the present invention.

FIG. 6 is a diagram that illustrates a filter module 410 according to an exemplary embodiment of the present invention. In this exemplary embodiment, light energy having information channels propagating at predefined wavelength regions of $\lambda_1$ through $\lambda_N$ can be introduced into a planar light guide circuit (PLC) 600 via an input waveguide 6101. The PLC 600 can have multiple optical paths 620 for propagating light energy in a single mode format. More specifically, the optical paths 620 can be properly dimensioned to only support single mode propagation of light energy. While the optical paths 620 have been illustrated as arrows in the drawings, it is noted that these optical paths typically have a cylindrical cross section, where the optical paths 620 are surrounded by another material or materials that do not support light propagation. The PLC 600 can be designed to channel or propagate optical energy to filtering devices A–D so that the light energy is separated into a plurality of discrete information channels.

The filtering devices A–D can be attached directly to the PLC 600 or they can be attached to respective optical waveguides 610 that can be also connected to the PLC 600. The zig zagging of optical paths 620 disposed within the PLC 600 and the flow direction of light energy passing through PLC 600 is often referred to as "cascading". The first reflection of stabilized monochromatic light energy at filter A in waveguide 610D1 drops an information channel propagating at a wavelength region of $\lambda_1$. During a second reflection of stabilized monochromatic light energy at filter A, waveguide 610A1 can add an information channel propagating at a predefined wavelength region of $\lambda_1$.

The filters A–D are preferably thin film interference filters that are centered on predefined wavelength regions. However, other filters are not beyond the scope of the present invention. The exemplary filter module 410 provides an efficient mechanism where information channels can be dropped or added or both with minimal signal loss and with minimal hardware. The optical waveguide 610 can be a collimating type waveguide, however, other waveguides are not beyond the scope of the present invention. The number and types of the optical waveguide 610 and filters A–D are not limited to those illustrated in the drawings. Additional or fewer filters and optical waveguides may be employed depending upon the number of information channels that need to be manipulated.

Figure 7:
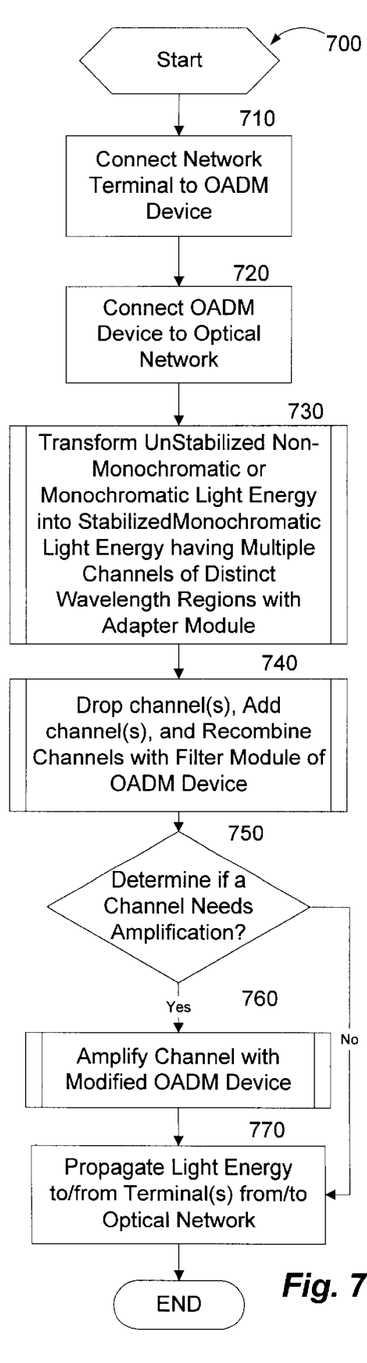
FIG. 7 is a logic flow diagram illustrating a process for increasing a number of information channels carried by an optical waveguide in accordance with an exemplary embodiment of the present invention.

FIG. 7 is a logic flow diagram illustrating a process for increasing a number of information channels carried by an optical waveguide in accordance with an exemplary embodiment of the present invention. Process 700 begins in step 710 in which an OADM device 310 is connected to a SONET network or ADM terminal 220 as illustrated in FIG. 3. However, step 710 may not be necessary if the OADM device 310 is not being combined with a conventional network. In other words, in new optical networks, each OADM device 310 can be connected directly to optical waveguides with out any additional hardware other than a user device such as a computer or LAN, such as user 60E illustrated in FIG. 3. In such a new optical network embodiment, light energy from a user 60E would still be stabilized by respective OADM devices 310.

In step 720, each OADM device 310 is connected to respective optical waveguides of an optical network such as the optical network 300 as illustrated in FIG. 3. Next, in routine 730, unstabilized non-monochromatic or monochromatic light energy is transformed into stabilized monochromatic light energy having multiple channels of distinct wavelength regions. The transformation of the light energy into the stabilized monochromatic light energy occurs within the wavelength adapter module 400 as illustrated in FIG. 4.

Subsequently, in routine 740, multiple information channels propagating at predefined wavelength regions can be dropped, added, or recombined. The dropping, adding, and recombining of information channels typically occurs within the filter module 410 as illustrated in FIG. 4.

In decision step 750, it is determined whether an information channel needs amplification. If the inquiry to decision step 750 is negative, then the "No" branch is followed to step 770 in which the stabilized monochromatic light energy is propagated between the terminals within the optical network 300 as illustrated in FIG. 3. If the inquiry to decision step 750 is positive, then the "Yes" branch is followed to routine 760 in which one or more information channels are amplified.

Figure 8:
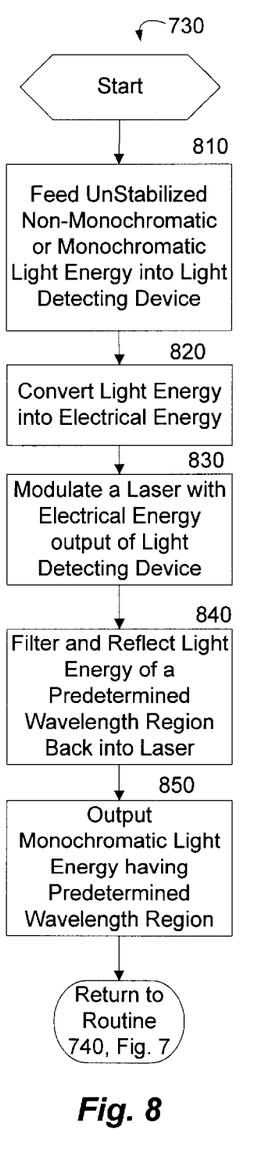
FIG. 8 is a logic flow diagram illustrating an exemplary routine corresponding to FIG. 7 for transforming unstabilized non-monochromatic or monochromatic light energy into stabilized monochromatic light energy in accordance with an exemplary embodiment of the present invention.

FIG. 8 is a logic flow diagram illustrating a routine of FIG. 7 for transforming unstabilized non-monochromatic or monochromatic light energy into stabilized monochromatic light energy in accordance with an exemplary embodiment of the present invention. Routine 730 begins with step 810 in which unstabilized non-monochromatic or monochromatic light energy is fed into a light detecting device 420, such as a photo detector, as illustrated in FIG. 4. Next, in Step 820, the light energy is converted by the light detecting device 420 from optical energy into electrical energy. In step 830, laser device 440 is modulated by the output of the light detecting device 420.

Subsequently, in step 840, the light energy outputted by the laser device 440 is filtered and reflected back into the laser device 440. In other words, for optical feedback assemblies 430 comprising wavelength selective devices such as Bragg gratings, light energy of a predetermined wavelength region is reflected back into the laser device 440. For optical feedback assemblies comprising thin-film interference filters in combination with partial reflecting devices, light energy of a predetermined wavelength is filtered and then reflected back into the laser device 440. Next, in step 850, stabilized monochromatic light energy having a predefined wavelength region is outputted from the laser device 440 through the filtering device 450. The process then returns to routine 740 of FIG. 7.

Figure 9:
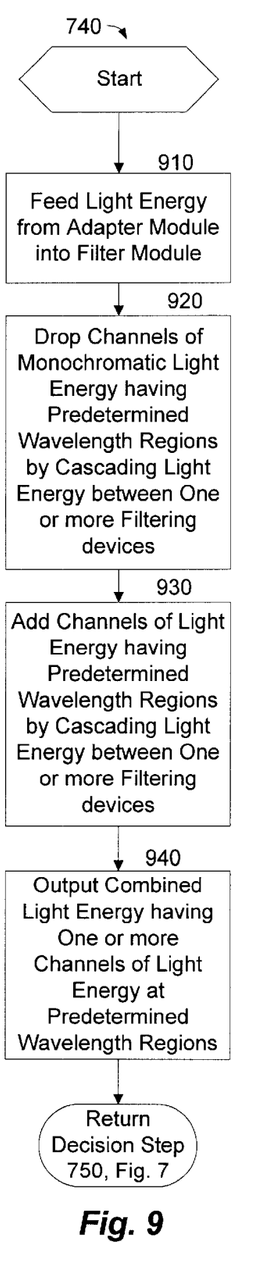
FIG. 9 is a logic flow diagram of an exemplary routine of FIG. 7 for separating light energy in to distinct information channels in accordance with an exemplary embodiment of the present invention

FIG. 9 is a logic flow diagram of routine 740 of FIG. 7. Routine 740 begins with step 910 in which light energy from the wavelength adapter module 400 is fed into the filter module 410. In step 920, information channels of stabilized monochromatic light energy having predefined wavelength can be dropped by cascading the light energy between one or more filtering devices A–D disposed in PLC 600 as illustrated in FIG. 6. Next, in step 930, information channels of light energy having predefined wavelength regions can be added by cascading light energy between the one or more filtering devices A–D. It is noted that the drop or add steps 920 or 930 are not necessary for every application. These steps can be eliminated depending on the design of a particular wavelength adapter 400. In step 940, the light energy flowing through the planar light guide circuit 600 can be combined. The process then returns to decision step 750 in FIG. 7.

Figure 10:
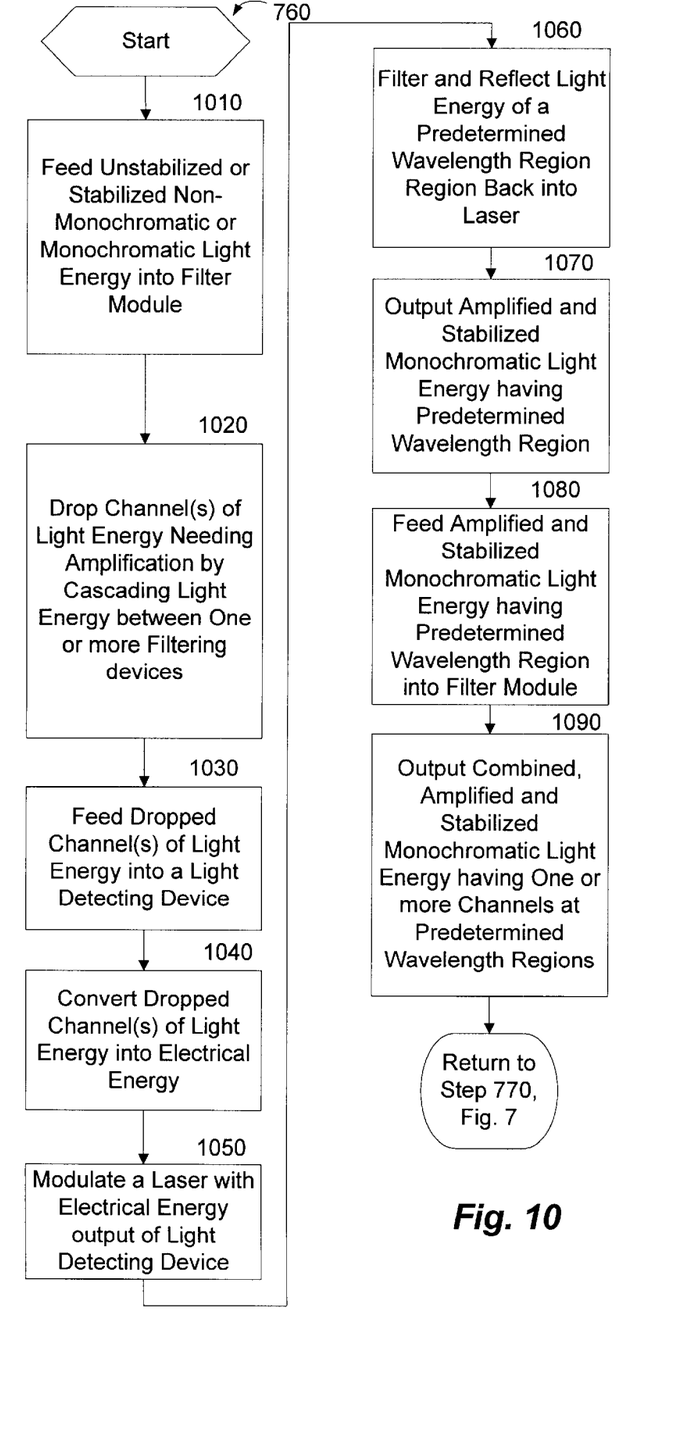
FIG. 10 is a logic flow diagram of an exemplary routine of FIG. 7 for amplifying light energy in accordance with an exemplary embodiment of the present invention

FIG. 10 is a logic flow diagram of routine 760 of FIG. 7. Routine 760 begins with step 1010 in which unstabilized non-monochromatic or monochromatic light energy having one or more channels of light energy of predefined wavelength regions is fed into a filter module as illustrated in FIG. 5. Alternatively, stabilized monochromatic light energy having one or more channels of light energy of predefined wavelength regions can be fed into the filter module 410. In other words, the amplification routine 760 can be applied to unstabilized non-monochromatic or monochromatic light energy as well as stabilized monochromatic light energy. This means that the OADM device 500 as illustrated in FIG. 5 can be used to amplify conventional light signals such as optical signals travelling in accordance with a SONET protocol in addition to light energy that has undergone wavelength division multiplexing.

In step 1020, information channels of monochromatic light energy having predefined wavelength regions needing amplification can be dropped by cascading the light energy between one or more filtering devices within the filter module 410 as illustrated in FIG. 5. The dropped monochromatic light energy channels can then be fed into a light detecting device 420 of a wavelength adapter module 400. In step 1040, the light detecting device 420 converts the dropped monochromatic channels of light energy into electrical energy. Next, in Step 1050, a laser device 440 is modulated with the electrical energy output of the light detecting device 420.

In Step 1060, the initial laser output is filtered and then reflected back into the laser device 440. Subsequently, in Step 1070, amplified and stabilized monochromatic light energy having a predefined wavelength region is outputted. The monochromatic light energy output is then fed into the filter module 410 as set forth in Step 1080. In Step 1090, the filter 410 outputs the amplified, stabilized, combined monochromatic light energy having one or more information channels of predefined wavelength regions. The process then returns to Step 770 of FIG. 7.

While the present invention can be typically employed in interoffice networks 40 and access networks 300, as set forth in the aforementioned illustrated embodiments, the invention is not limited to these applications and can be used in other areas that require increased information traffic handling in an optical fiber environment. For example, the present invention may be employed in the cable TV environment, which employs optical fibers. Alternatively, the present invention could be employed in smaller local area networks (LANs).

With the present invention, the number of information channels carried by an optical waveguide is substantially increased. The OADM device of the present invention increases the number of information channels within an optical waveguide by utilizing different wavelength regions of light. Further, the present invention is easily overlayed on existing optical network architectures. Stated simply, the present invention is overlayed on conventional optical network systems such that an information channel operating according to a conventional network protocol is unaffected. Meanwhile, the present invention provides additional channels that do not need to be dependent on the conventional optical network protocol. Additionally, the invention can utilize conventional diode laser technology while improving the output thereof. The OADM device stabilizes the output wavelength region of a conventional diode laser to any specific wavelength region with minimal hardware or structural modifications. And lastly, the present invention is able to amplify one or more specific information channels operating at predefined wavelength regions.

It should be understood that the foregoing relates only to illustrated embodiments of the present invention, and that numerous changes may be made therein without departing from the spirit and scope the invention as defined by the following claims.

What is claimed is:

1. An optical add-drop multiplexing (OADM) device comprising:
   a wavelength adapter module for transforming unstabilized non-monochromatic or monochromatic light energy into one or more channels of stabilized monochromatic light energy having one or more predefined wavelength regions; and
   a filter module for at least one of dropping, adding, and recombining one or more channels of stabilized monochromatic light energy having one or more predefined wavelength regions, whereby information traffic carried by an optical waveguide is substantially increased; and wherein the OADM device is part of a SONET optical network.

2. The OADM device of claim 1, wherein the wavelength adapter module further comprises:
   a light detector for converting light energy into electrical energy; and
   a laser device for outputting modulated light energy in accordance with said electrical energy.

3. The OADM device of claim 2, wherein laser device comprises a laser diode initially producing unstabilized non-monochromatic or monochromatic light energy at approximately 1310 or 1550 nm wavelength region prior to stabilization.

4. The OADM device of claim 1, wherein the filter module comprises:

a planar light guide circuit;

a plurality of filters disposed adjacent to said planar light guide circuit; and a plurality of optical waveguides connected to said planar light guide circuit.

5. The OADM device of claim 4, wherein each filter comprises a thin film interference filter.

6. An optical network comprising:

a SONET network; and a plurality of optical add-drop multiplexing (OADM) devices connected to a plurality of SONET network terminals;

each OADM device comprising:

a wavelength adapter module for transforming unstabilized non-monochromatic or monochromatic light energy into one or more channels of stabilized monochromatic light energy having one or more predefined wavelength regions; and a filter module for at least one of dropping, adding, and recombining one or more channels of stabilized monochromatic light energy having one or more predefined wavelength regions.

7. The optical network of claim 6, wherein the SONET network comprises a protection switching scheme that operates irrespective of the plurality of OADM devices.

8. The optical network of claim 6, wherein each OADM balances information flow by propagating light energy containing information channels through respective optical waveguides connected to each OADM device, whereby a number of information routes between at least one of users and central offices are increased.

9. The optical network of claim 6, wherein the unstabilized non-monochromatic or monochromatic light energy is light energy propagating according to a predefined network protocol.

10. The optical network of claim 9, wherein the unstabilized non-monochromatic or monochromatic light energy is light energy propagating according to a synchronous optical network (SONET) protocol.

11. The optical network of claim 6, wherein the wavelength adapter module further comprises:

a light detector for converting light energy into electrical energy; and a laser device for outputting modulated light energy in accordance with said electrical energy.

12. The optical network of claim 11, wherein laser device comprises a laser diode initially producing unstabilized non-monochromatic or monochromatic light energy at approximately 1310 or 1550 nm wavelength region prior to stabilization.

13. The optical network of claim 11, wherein laser device comprises a Fabry-Perot laser initially producing unstabilized non-monochromatic or monochromatic light energy at approximately 1310 or 1550 nm wavelength region prior to stabilization, said Fabry-Perot laser producing stabilized light energy at a predefined wavelength region within a spectral grid, said grid comprises a portion of either said 1310 or 1550 nm wavelength region.

14. The optical network of claim 6, wherein the wavelength adapter module further comprises a optical feedback assembly coupled to an optical waveguide.

15. The optical network of claim 14, wherein the optical feedback assembly comprises a Bragg grating.

16. The optical network of claim 6, wherein the filter module comprises:

a planar light guide circuit;

a plurality of filters disposed adjacent to said planar light guide circuit; and a plurality of optical waveguides connected to said planar light guide circuit.

17. The optical network of claim 16, wherein each filter comprises a thin film interference filter.

18. The optical network of claim 6, wherein the wavelength adapter module comprises a semiconductor laser in communication with a wavelength-specific reflector for stabilizing output of said laser, said reflector being part of a single mode optical circuit that propagates light energy between said reflector and an exit port of said laser, and said wavelength adapter module and said filter module form a unitary structure.

19. The optical network of claim 6, wherein said single mode optical circuit comprises a fiber optic cable.

20. An optical add-drop multiplexing (OADM) device comprising:

a wavelength adapter module for transforming unstabilized non-monochromatic or monochromatic light energy into one or more channels of stabilized monochromatic light energy having one or more predefined wavelength regions, wherein the wavelength adapter module further comprises a optical feedback assembly comprising a Bragg grating coupled to an optical waveguide; and a filter module for at least one of dropping, adding, and recombining one or more channels of stabilized monochromatic light energy having one or more predefined wavelength regions, whereby information traffic carried by an optical waveguide is substantially increased.

* * * * *

(12) INTER PARTES REEXAMINATION CERTIFICATE (975th)
United States Patent
Medin et al.

(10) Number: US 6,542,660 C1
(45) Certificate Issued: Oct. 24, 2014

(54) METHOD AND SYSTEM FOR INCREASING A NUMBER OF INFORMATION CHANNELS CARRIED BY OPTICAL WAVEGUIDES

(75) Inventors: Michael W. Medin, Roswell, GA (US); Michael L. Wach, Atlanta, GA (US)

(73) Assignee: Graywire, LLC, Alpharetta, GA (US)

Reexamination Request:
No. 95/001,148, Feb. 19, 2009

Reexamination Certificate for:
Patent No.: 6,542,660
Issued: Apr. 1, 2003
Appl. No.: 09/578,777
Filed: May 25, 2000

Related U.S. Application Data

(60) Provisional application No. 60/135,909, filed on May 25, 1999.

(51) Int. Cl.
*G02B 6/28* (2006.01)
(52) U.S. Cl.
USPC ............ 385/24; 385/37; 359/124; 359/130
(58) Field of Classification Search
None
See application file for complete search history.

(56) References Cited

To view the complete listing of prior art documents cited during the proceeding for Reexamination Control Number 95/001,148, please refer to the USPTO's public Patent Application Information Retrieval (PAIR) system under the Display References tab.

*Primary Examiner* — Tuan H Nguyen (57) ABSTRACT

An optical add/drop multiplexing (OADM) device can increase the number of information channels carried by an optical waveguide by utilizing different wavelength regions of light. In other words, each information channel can be assigned a specific wavelength region of light The OADM device can add additional virtual optical waveguides equal to the number of wavelength regions of light that can be efficiently propagated along a single optical waveguide. The OADM device can utilize conventional diode laser technology for adding information channels at predefined wavelength regions into an optical network. The OADM device can stabilize the output wavelength region of a conventional laser diode to any specific wavelength region with minimal hardware or structural modifications. By utilizing off the shelf hardware, the OADM device can lower manufacturing costs while providing an ample supply of spare parts. Further, the OADM device can be used to amplify optical signals that propagate along the improved optical networks of the present invention. The OADM device can be easily interfaced with terminals designed for Synchronous Optical NETworks (SONETs). Also, the OADM device permits functionality of a conventional optical network to remain the same or constant. The OADM device employs cascading and planar light guide circuits to minimize hardware and to reduce signal losses.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-20 are cancelled.

\* \* \* \* \*